United States Patent
Ramsay et al.

(10) Patent No.: US 12,338,802 B2
(45) Date of Patent: Jun. 24, 2025

(54) SYSTEM AND METHOD FOR GENERATION AND EXTRACTION OF FOSSIL FUEL AND HYDROGEN FROM A GEOLOGIC FORMATION WITH INCREASED ENERGY EFFICIENCY

(71) Applicant: Abu Dhabi National Oil Company, Abu Dhabi (AE)

(72) Inventors: Travis S. Ramsay, Abu Dhabi (AE); Rahul M. Fonseca, Abu Dhabi (AE)

(73) Assignee: Abu Dhabi National Oil Company, Abu Dhabi (AE)

( * ) Notice: Subject to any disclaimer, the term of this patent is extended or adjusted under 35 U.S.C. 154(b) by 0 days.

(21) Appl. No.: 18/419,498

(22) Filed: Jan. 22, 2024

(65) Prior Publication Data
US 2024/0328398 A1    Oct. 3, 2024

Related U.S. Application Data

(60) Provisional application No. 63/492,916, filed on Mar. 29, 2023.

(51) Int. Cl.
*F03G 4/00* (2006.01)
*F03G 4/02* (2006.01)
(Continued)

(52) U.S. Cl.
CPC ............... *F03G 4/00* (2021.08); *F03G 4/02* (2021.08); *F03G 4/026* (2021.08); *F03G 4/029* (2021.08);
(Continued)

(58) Field of Classification Search
CPC ... F03G 4/00; F03G 4/02; F03G 4/026; F03G 4/029; F24T 10/10; F24T 10/20; F24T 50/00
See application file for complete search history.

(56) References Cited

U.S. PATENT DOCUMENTS

| | | | |
|---|---|---|---|
| 8,235,141 B2 * | 8/2012 | Foppe | F24T 10/20 166/402 |
| 2008/0173443 A1 * | 7/2008 | Symington | E21B 43/2405 166/248 |

(Continued)

FOREIGN PATENT DOCUMENTS

| | | | |
|---|---|---|---|
| CA | 3088228 A1 | 1/2022 | |
| WO | WO-2023059896 A1 * | 4/2023 | |

OTHER PUBLICATIONS

Carbon Dioxide Absorbs and Re-emits Infrared Radiation, UCAR Center for Science Education, archived as early as May 9, 2021 (Year: 2021).*
Fan, Y. et al; Numerical Simulation of the In-situ Upgrading of Oil Shale, SPE J. 15 (2010).
Ramsay et al.; Electrode Placement Evaluation in Radio Frequency Hydrogen Generation Using Multiphysics Simulation in Proceedings of the Abu Dhabi International Petroleum Exhibition and Conference, Abu Dhabi, UAE, Oct. 31-Nov. 3, 2022, SPE-210801-MS.
(Continued)

*Primary Examiner* — Audrey B. Walter
(74) *Attorney, Agent, or Firm* — Renner, Otto, Boisselle & Sklar, LLP

(57) ABSTRACT

A method for extracting a fuel from a geologic formation comprises heating a target volume in the geologic formation to generate the fuel via thermal conversion of a precursor material, thereby also heating a part of the geologic formation, extracting the generated fuel from the geologic formation; recovering heat from the geologic formation; and using the recovered heat for one or more of: heating the target volume, heating a different target volume, extracting the fuel, recovering the heat from the geologic formation, processing the extracted fuel, and converting the recovered heat into another form of storable energy.

20 Claims, 4 Drawing Sheets

(51) Int. Cl.
F24T 10/10 (2018.01)
F24T 10/20 (2018.01)
F24T 50/00 (2018.01)

(52) U.S. Cl.
CPC .............. *F24T 10/10* (2018.05); *F24T 10/20* (2018.05); *F24T 50/00* (2018.05)

(56) References Cited

U.S. PATENT DOCUMENTS

| 2014/0130498 A1* | 5/2014 | Randolph | ............... F24T 10/20 166/267 |
| 2018/0106138 A1 | 4/2018 | Randolph | |
| 2022/0034258 A1 | 2/2022 | Aikman | |

OTHER PUBLICATIONS

Ramsay, T et al.; Uncertainty Quantification of Allen-Cahn Phase Field Parameters in Multiphysics Simulation of Oil Shale Radio Frequency Heating in Proceedings of the SPE Annual Technical Conference and Exhibition, Dubai, UAE, Sep. 21-23, 2021, SPE-205866-MS.

Yuan et al; High-Purity, CO2-Free Hydrogen Generation from Crude Oils in Crushed Rocks Using Microwave Heating in Proceedings of the 2021 SPE Annual Technical Conference and Exhibition, Dubai, UAE, Sep. 21-23, 2021, SPE-206341-MS.

* cited by examiner

SYSTEM AND METHOD FOR GENERATION AND EXTRACTION OF FOSSIL FUEL AND HYDROGEN FROM A GEOLOGIC FORMATION WITH INCREASED ENERGY EFFICIENCY

TECHNICAL FIELD

The present invention relates to a method and a system for extracting fossil fuel and hydrogen that is generated via in-situ thermal conversion from a geologic formation with improved energy efficiency.

TECHNICAL BACKGROUND

Fossil fuels like hydrocarbons (e.g., crude oil, natural gas, etc.) or hydrogen gas ($H_2$) can be generated in-situ, e.g., within a geologic formation from a precursor material like kerogen, bitumen, tar mats or liquid crude oil (e.g., in the case of $H_2$), via thermal conversion. For example, Fan, Y. et. al.; *Numerical Simulation of the In-situ Upgrading of Oil Shale*, SPE J. 15 (2010) discusses a thermal in-situ upgrading processes for producing hydrocarbons from oil shale, including a decomposition process of kerogen in the shale through a series of chemical reactions into liquid and gaseous products.

Ramsay et al.; *Electrode Placement Evaluation in Radio Frequency Hydrogen Generation Using Multiphysics Simulation* in Proceedings of the Abu Dhabi International Petroleum Exhibition and Conference, Abu Dhabi, UAE, 31 Oct.-3 Nov. 2022, SPE-210801-MS describes the uncertainty quantification of an explicitly coupled multiphysics simulation of in-situ pyrolysis by radio frequency heating in oil shale.

Ramsay, T et al.; *Uncertainty Quantification of Allen-Cahn Phase Field Parameters in Multiphysics Simulation of Oil Shale Radio Frequency Heating* in Proceedings of the SPE Annual Technical Conference and Exhibition, Dubai, UAE, 21-23 Sep. 2021, SPE-205866-MS discusses a dielectric heating technique for converting kerogen-rich oil shale into liquid oil through in-situ pyrolysis.

Yuan et al; *High-Purity, $CO_2$-Free Hydrogen Generation from Crude Oils in Crushed Rocks Using Microwave Heating* in Proceedings of the 2021 SPE Annual Technical Conference and Exhibition, Dubai, UAE, 21-23 Sep. 2021, SPE-206341-MS discusses high-purity, $CO_2$-free $H_2$ generation from crude oils in crushed rocks using microwave heating.

SUMMARY

Generally, in-situ fuel conversion techniques such as discussed above may exhibit heat-loss e.g., caused by heat transfer from a target volume where the fuel is generated, e.g., via radio frequency (RF), microwave (MW) frequency, or Terraherz, (THz) heating, to surrounding rock formations, e.g., via heat conduction or material advection (see discussion of FIG. 1 below) or a similar heat transport mechanism. In this context, new fuel conversion and/or extraction methods and systems are desired that might improve overall process energy efficiency and reduce overall carbon footprint.

Specifically, aspects of the present disclosure relate to a method for extracting a fuel from a geologic formation, comprising heating a target volume in the geologic formation to generate the fuel via thermal conversion of a precursor material thereby also heating a part of the geologic formation; extracting the generated fuel from the geologic formation; recovering heat from the geologic formation; and using the recovered heat for one or more of: heating the target volume, heating a different target volume, extracting the fuel, recovering the heat from the geologic formation, processing the extracted fuel, and converting the recovered heat into another form of storable energy.

For example, the precursor material may comprise kerogen, oil shale, bitumen, tar mats, and liquid crude oil or similar hydrocarbon rich materials.

For instance, liquid crude oil may be generated by thermal conversion of kerogen, tar, bitumen, and oil shale and $H_2$ gas may be generated via thermal conversion of liquid crude oil. For example, the heat supplied to the target volume may drive a sequence of chemical reactions that produce $H_2$ from hydrocarbon molecules such as alkanes, cycloalkanes or aromatic hydrocarbons that may be present in liquid crude oil that is present in the target volume.

Aspects of the present disclosure thus allow to recover and use at least part of the lost heat from the geologic formation e.g., via an open-loop (cf. FIG. 2) or a closed-loop (cf. FIG. 3) geothermal energy harvesting system. The recovered heat may for example be used for generating electricity e.g., via a generator powered by a steam turbine. The recovered heat, e.g., via the generated electricity, may be used for heating the target volume and or a different target volume, for extracting the generated fuel, for recovering the heat from the geologic formation, for processing the extracted fuel and/or for conversion into a storable form of energy. Generally, coupling of in-situ heating with a geothermal energy harvesting system as disclosed herein may thus allow to harvest and reuse heat that otherwise may be lost due to heat conduction, material advection or a similar heat transport process.

Further aspects of the present disclosure relate to a system for extracting fuel from a geologic formation. The system may comprise a heating system configured for heating a target volume in the geologic formation to generate the fuel via thermal conversion of a precursor material thereby also heating a part of the geologic formation. The system may further comprise a fuel extractor (e.g., an oil or gas pump) configured for extracting the generated fuel from the geologic formation, and a geothermal energy harvesting system configured for recovering heat from the geologic formation. The geothermal energy harvesting system may be further configured for providing the recovered heat for usage in one or more of: heating the target volume, heating a different target volume, extracting the fuel, recovering the heat from the geologic formation, processing the extracted fuel, and converting the recovered heat into another form of storable energy.

Further aspects of the present disclosure and some related benefits are described in the following with reference to the appended drawings.

DETAILED DESCRIPTION OF ILLUSTRATIVE EXAMPLES

While specific feature combinations are described in the following with respect to exemplary aspects of the present disclosure, it is to be understood that not all features of the described aspects must be present for realizing the technical advantages provided by the systems and methods disclosed herein. The disclosed examples may be modified by combining certain features of one example with one or more features of other examples if technically feasible and functionally compatible. Specifically, the skilled person will understand that features, steps, components and/or functional elements of one example can be combined with technically compatible features, steps, components and/or functional elements of any other example disclosed herein.

The term "based on" as used herein, shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. When reference is made herein to a "component", "unit", "device" or the like, this should not be understood as limiting to a particular "component", "unit", "device" or the like, but should encompass other implementation that could have similar and/or the same functions. The appended drawings are of schematic nature and may not be drawn to scale.

Figure 1:
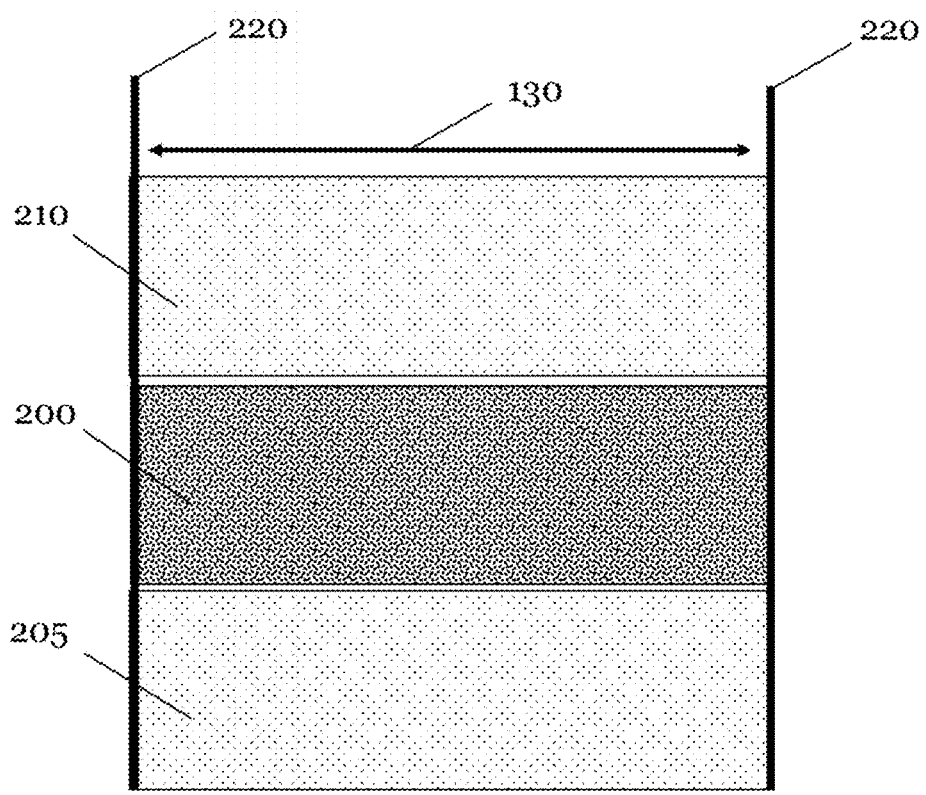
FIG. 1 is a schematic illustration showing in-situ fuel generation by thermal conversion in a geologic formation comprising a target volume according to aspects of the present disclosure.

FIG. 1 is a schematic representation of fuel generation via thermal conversion of a precursor material and the associated heat loss in a geologic formation. In the example of FIG. 1, electromagnetic radiation (e.g., RF or MW, or THz radiation) is applied by using electrodes and/or antennas 220 that are positioned at a relative distance 130 to each other subsurface within the geologic formation, e.g., within well holes/fuel extraction wells that may be used for extracting the generated fuel. The antennas 220 may cover a target volume 200 that is arranged in the geologic formation e.g., between an underburden volume 205 and an overburden volume 210. The target volume 200 may comprise the precursor material, e.g., kerogen, tar, bitumen and/or liquid crude oil etc. that can thermally be converted into a fuel, e.g., into liquid crude oil, $H_2$ gas, natural gas etc.

The electromagnetic (EM) heating shown in FIG. 1 is based on the complex valued permittivity of material in the target volume 200 allowing for energy absorption via dielectric heating which eventually may lead to liquid oil phase development from e.g., kerogen, e.g., in the case of oil shale, or to $H_2$ generation from liquid crude oil. Since dielectric heating is essentially a resonance phenomenon, the amount of absorbed energy per unit of time is typically a function of the frequency of the applied EM radiation. Depending on the naturally present complex valued permittivity of the material in the target volume 200, it might be necessary or beneficial to inject a support material into the target volume 200 e.g., to enhance absorption of the electromagnetic energy provided by the EM radiation.

In this manner, the precursor material, upon being heated by the EM radiation emitted by antennas 220, may be thermally converted into fuel in the target volume 200. Typically, in this process not all heat supplied via absorption of the EM heating may be used to convert the precursor material into fuel. An alternative heating method to initiate the conversion of the precursor material into fuel may be methods such as e.g., steam heating, thermoelectric heating, or combustion heating etc. For example, heat may be lost via heating the precursor material without conversion. Further, the fuel and/or adjacent rock formations may also be heated, e.g., the overburden volume 210 or the underburden volume 205, e.g., via heat conduction or advection or a similar heat transport process. The overburden volume 210 and the underburden volume 205 may comprise different materials than the target volume 200 and may thus not contain hydrocarbons and/or may not substantially absorb the applied EM radiation.

Figure 2:
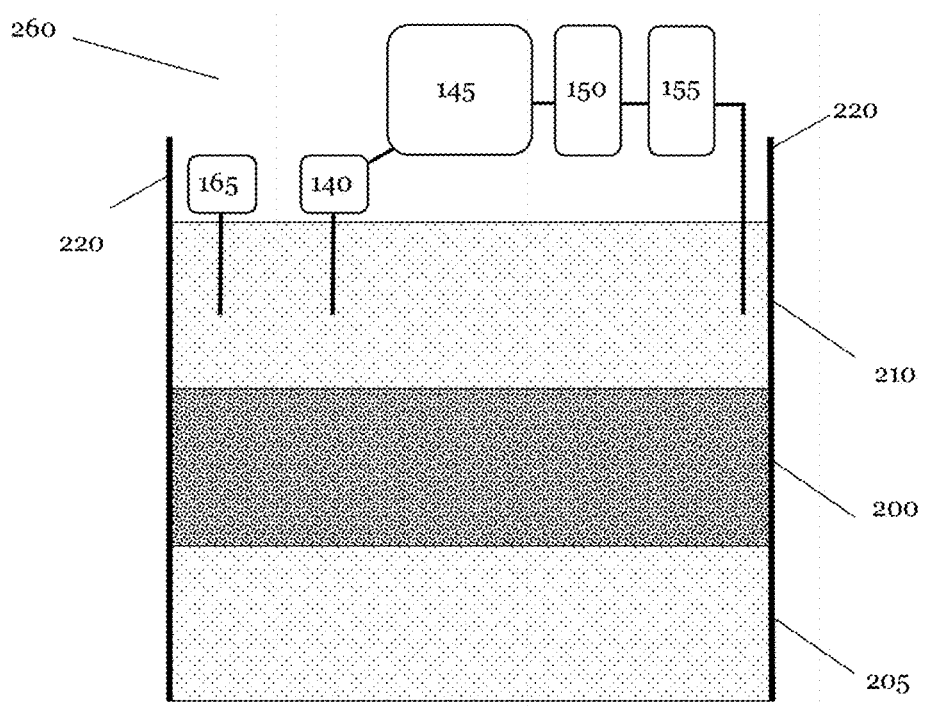
FIG. 2 is a schematic illustration showing an open-loop geothermal energy harvesting system coupled to an in-situ fuel generation and extraction system according to aspects of the present disclosure.

FIG. 2 illustrates an open-loop system 260 for extracting fuel from a geologic formation according to aspects of the present disclosure. The system 260 comprises a heating system 220 (e.g., EM wave generation antennas, a combustion heating system, a thermoelectric heater, a steam heating system etc.) configured for heating a target volume 200 in the geologic formation to generate the fuel via thermal conversion of precursor material such as solid organic matter (e.g., kerogen, bitumen, tar), or liquid crude oil thereby also heating a part of the geologic formation. For example, in combustion heating oxygen or air may be injected into the target volume 200 located in the subsurface where it may mix with the precursor material. Ignition may be made through a source located in an extraction well. Once the combustion process starts, it produces light hydrocarbons (liquid and gaseous), hydrogen, coke, and/or steam from reservoir water. The fire advances as a front, consuming more of the precursor material but also generating more of the aforementioned products.

The system 260 may further comprise a fuel extractor such as a pump 165, that may be configured for extracting the generated fuel from the target volume 200. The fuel extractor 165 may be collocated, integrated with and/or arranged in proximity to the heating system 220. For example, the fuel extractor 165 and the heating system 260 may use the same fuel extraction well drilled into the geologic formation above the target volume.

The system 260 may further comprise an open-loop geothermal energy harvesting system configured for recovering heat from the geologic formation, and for providing the recovered heat for usage in one or more of: heating the target volume or a different target volume, extracting the generated fuel, recovering the heat from the geologic formation, processing of the extracted fuel, and converting the recovered heat into another form of storable energy that may be used at a later time.

The open-loop geothermal energy harvesting system illustrated in FIG. 2 as part of the fuel extraction system 260 may be configured for recovering the heat from the geologic formation by extracting one or more of warm water or steam. For example, warm water or steam may be extracted from geothermal wells drilled into the geologic formation in the vicinity (e.g., above) the target volume that is being heated. The geothermal energy harvesting system may further comprise an electricity generator 150 operably connected to a turbine 155 (e.g., a steam turbine) and configured for generating electricity from the extracted warm water or steam. The system 260 may comprise a further pump 140 that may be configured to pump used water back into the geologic formation, e.g., into the target volume 200 and/or the overburden volume 210. The turbine 155 may be operably connected an electricity generator 150 of the geothermal energy harvesting system that generates electricity. The used water or steam exiting the turbine 155 may then be cooled, e.g., via a cooling tower 145 before being pumped back, as water, into the geologic formation.

In some configurations, the heating system 220 may comprise one or more of: an EM heating system (as discussed for FIG. 1 above), a thermoelectric heating system, a steam heating system, and a combustion heating system. Further, the precursor material may comprise one or more of a solid organic material such as kerogen, tar, and bitumen, and liquid crude oil. The generated fuel may comprise one or more of: liquid crude oil, $H_2$ gas, and natural gas. The open-loop system 260 may further comprise a cooler and/or a compressor (not shown), that may be operably connected to the fuel extractor 165. For example, the fuel extractor 165 may comprise or be arranged within a fuel extraction well. For instance, the cooler may be configured for cooling the extracted fuel and the compressor may be configured for compressing the extracted fuel (e.g., $H_2$ or natural gas) e.g., to facilitate fuel transport. When the fuel comprises $H_2$ gas, the cooler may also comprise a cryogenic cooler configured for cooling the $H_2$ gas below a temperature of −20 degrees Kelvin to generate liquid hydrogen. The system 260 may also comprise a cryogenic storage tank for storing the generated liquid hydrogen.

In some aspect, the generated electricity may for example be used for powering the fuel extractor 165, the heating system 220 and/or further equipment needed for generating, extracting, processing and/or transporting the fuel. Further, the generated electricity may also be stored, e.g., as fuel. For example, $H_2$ gas may be generated via electrolysis.

Figure 3:
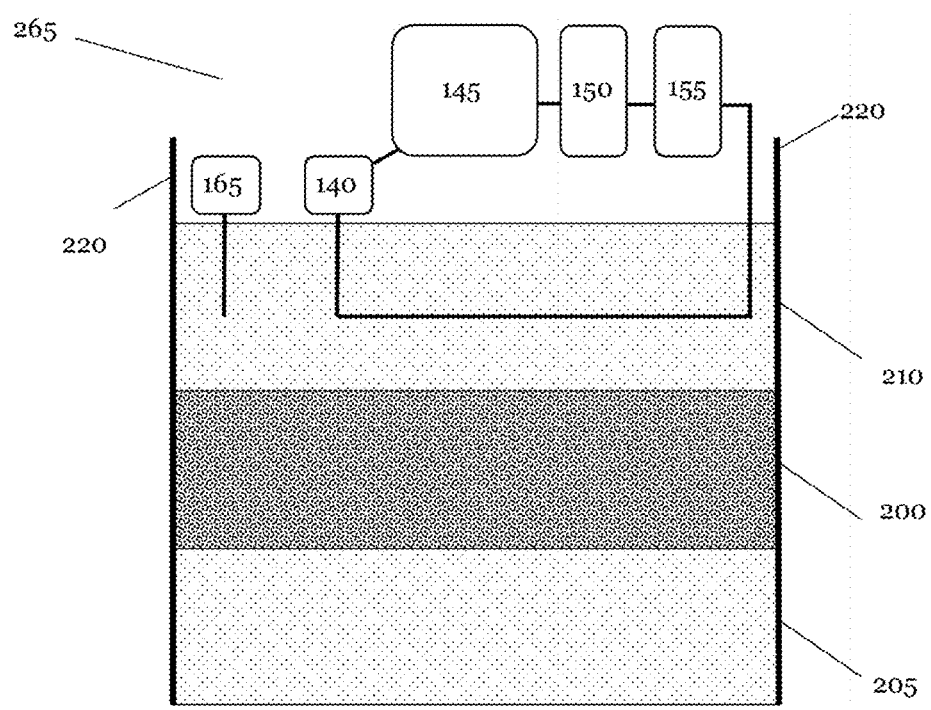
FIG. 3 is a schematic illustration showing a closed-loop geothermal energy harvesting system coupled to an in-situ fuel generation and extraction system according to aspects of the present disclosure.

The system 260 that is illustrated in FIG. 2 is deemed an open-loop system because the used water that is pumped back (e.g., from the cooling tower 145) into the geologic formation is not circulating in dedicated subsurface tubing or similar structures as it is the case for the working fluid of a closed-loop system illustrated in FIG. 3. Naturally, also in an open-loop system, some of the used water that is pumped back into the geologic formation may eventually flow or diffuse to the position of a geothermal well used for extracting the warm water or steam from the geologic formation and thus indirectly circulate within the open-loop system. In this manner, the water that is pumped back into the geologic formation may be re-heated during the process of return flow through the subsurface.

FIG. 3 illustrates an exemplary closed-loop system 265 that differs from the exemplary open-loop systems discussed with reference to FIG. 2 in that a working fluid (e.g., desalinated water) is circulating within subsurface heat exchange tubing or similar equipment that is in thermal contact with a heated part of the geologic formation. Such a closed-loop system may for example be used if the geologic formation does not comprise enough ground water that may be used in an open-loop system. For example, the heated working fluid (e.g., application specific chemicals and/or desalinated water) may be pumped to a heat exchanger (not shown) that may generate steam to power a steam turbine 155. The cooled working fluid may then be pumped back into the subsurface heat exchange tubing to get heated again by the geologic formation. Apart from this difference, the closed-loop system 265 is otherwise functionally identical to the open-loop system 260 shown in FIG. 2. In some aspects, both types of system discussed above may further comprise a carbon dioxide separator for separating carbon dioxide from the generated fuel to further reduce the carbon footprint of the fuel extraction process.

Figure 4:
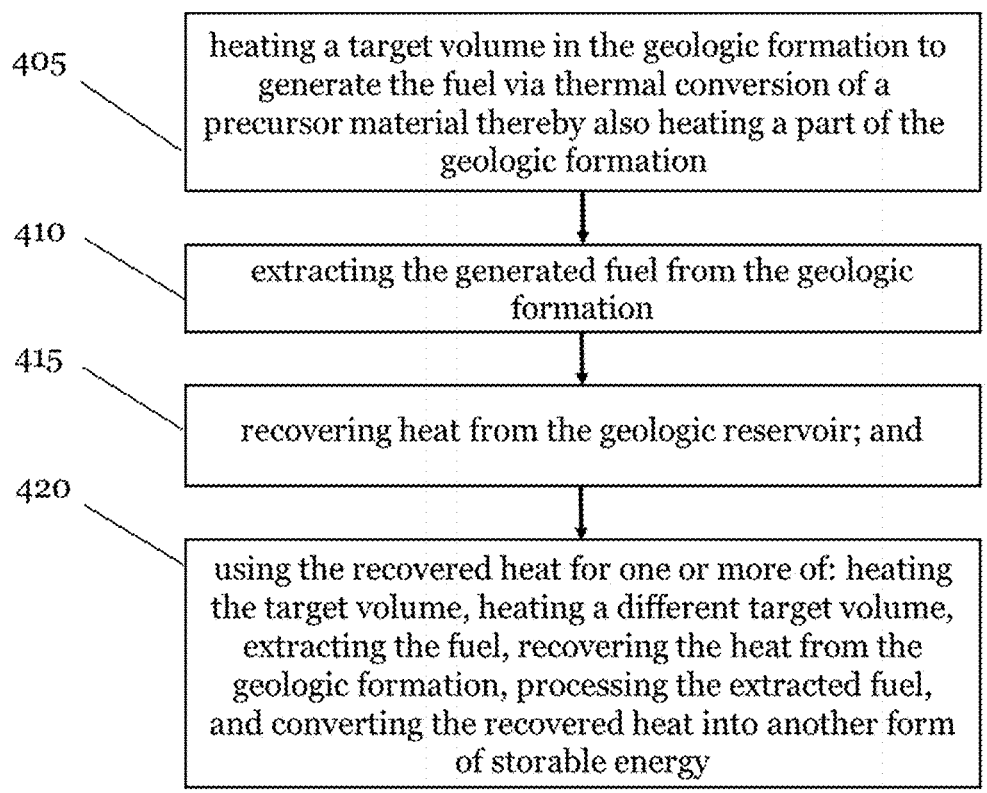
FIG. 4 is a flow-diagram illustrating a method for extracting fuel from a geologic formation according to aspects of the present disclosure.

FIG. 4 shows a schematic flow-chart of a method for extracting a fuel from a geologic formation. It should be noted that the illustrated order of steps is only shown as an example. Other orders are possible, and some steps may also be executed in parallel. For example, the steps of the illustrated method may all be carried out in parallel as part of a continuous fuel extraction process that may go on for an extended period, e.g., for hours, days, weeks, months etc.

In step 405 a target volume in a geologic formation is heated to generate fuel via thermal conversion of a precursor material thereby also heating the geologic formation. In some aspects, heating the target volume may comprise one or more of: electromagnetic heating (e.g., via emission of RF, MW or THz frequency radiation that is absorbed in the target volume), thermoelectric heating, steam heating and combustion heating. Further, the precursor material may comprise one or more of solid organic matter (e.g., kerogen, tar, bitumen, etc.), and liquid crude oil. In some aspects, the method of FIG. 4 may further comprise injecting a support material into the target volume. For example, the support material may comprise a material that enhances absorption of electromagnetic waves. Further, the support material may also comprise a catalyst increasing the reaction rate of a chemical reaction involved in generation of the extracted fuel, e.g., a chemical reaction involved in converting liquid crude oil into $H_2$ gas. For example, the generated fuel may comprise one or more of: liquid crude oil, natural gas, and $H_2$ gas.

In step 410 the generated fuel may be extracted from the geologic formation, e.g., via using a fuel extractor such as a production well, a pump or similar fuel extraction equipment. In step 415 heat may be recovered from the geologic formation, e.g., via an open-loop (cf. FIG. 2) or a closed-loop (cf. FIG. 3) geothermal energy harvesting system. In step 420, the recovered heat may be used for one or more of: heating the target volume, heating a different target volume, extracting the generated fuel, recovering heat from the geologic formation, and processing of the extracted fuel. For example, recovering the heat from the geologic formation may comprise extracting one or more of: warm water or steam, e.g., when using an open-loop energy harvesting system.

Recovering the heat from the geologic formation may also comprise pumping a working fluid (e.g., application specific chemicals and/or water) through subsurface heat exchange tubing arranged in thermal contact with a part of the geologic formation (cf. FIG. 3). In some aspects, electricity may be generated from the extracted warm water or steam or from the heated working fluid. For example, the working fluid may be used to generate steam via a heat exchanger and the steam may be used to power a steam turbine driving an electricity generator. For example, the heat may be recovered using a geothermal energy harvesting system comprising an electricity generator operably coupled to a turbine. Further, recovering heat from the geologic formation may also comprise recovering heat from the extracted fuel via a heat exchanger.

The generated electricity may then be used for one or more of: heating the target volume, heating a different target volume, extracting the generated fuel, recovering the heat from the geologic formation (e.g., for operating the pump used to pump the working fluid through the subsurface heat exchange tubing or the water back into the geologic formation), and processing of the extracted fuel. For example, the generated electricity may be used for operating a cryogenic cooler for liquifying $H_2$ or natural gas as well as a compressor for compressing the extracted fuel.

Further, the heat may be recovered using a geothermal energy harvesting system comprising an electricity generator operably coupled to a turbine that may be power by the warm water and/or steam. In some aspects, the method of FIG. 4 may also comprise processing the extracted fossil fuel, wherein processing may comprise on or more of: refining the extracted fossil fuel, compressing the extracted fossil fuel, and cooling the extracted fossil fuel. For example, if $H_2$ or natural gas is generated and extracted, the extracted $H_2$ or natural gas may be cooled to cryogenic temperature, e.g., to below 20 Kelvin, to liquefy it and thereby facilitate storage and transportation.

The invention claimed is:

1. A method for extracting fuel from a geologic formation comprising:
   heating a target volume in the geologic formation to generate the fuel via thermal conversion of a precursor material thereby also heating a part of the geologic formation;
   extracting the generated fuel from the geologic formation, wherein the fuel comprises hydrogen gas;
   recovering heat from the geologic formation;
   cooling the extracted fuel below a temperature of 20 degrees Kelvin via a cryogenic cooler to generate liquid hydrogen; and
   storing the generated liquid hydrogen via a cryogenic storage tank;
   using the recovered heat for one or more of: heating the target volume, heating a different target volume, extracting the fuel, recovering the heat from the geologic formation, processing the extracted fuel, and converting the recovered heat into another form of storable energy.

2. The method of claim 1, wherein heating the target volume comprises one or more of: electromagnetic heating, thermoelectric heating, steam heating, and combustion heating.

3. The method of claim 1, wherein the precursor material comprises one or more of solid organic matter, natural gas, and liquid crude oil.

4. The method of claim 1, wherein the heat is recovered using a geothermal energy harvesting system comprising an electricity generator operably coupled to a turbine.

5. The method of claim 1, wherein the generated fuel comprises one or more of: liquid crude oil, natural gas, and hydrogen gas.

6. The method of claim 1, wherein recovering heat from the geologic formation comprises recovering heat from the extracted fuel via a heat exchanger.

7. The method of claim 1,
   wherein recovering the heat from the geologic formation comprises extracting one or more of: warm water or steam from the geologic formation; or
   wherein recovering the heat from the geologic formation comprises pumping a working fluid through subsurface heat exchange tubing arranged in thermal contact with a part of the geologic formation.

8. The method of claim 7, further comprising:
   generating electricity from the extracted warm water or steam or from the working fluid.

9. The method of claim 1, further comprising:
   injecting a support material into the target volume.

10. The method of claim 9, wherein the support material comprises a material that enhances absorption of electromagnetic radiation.

11. The method of claim 9, wherein the support material comprises a catalyst increasing the reaction rate of a chemical reaction involved in the generation of the extracted fuel.

12. A system for extracting fuel from a geologic formation comprising:
   a heating system configured for heating a target volume in the geologic formation to generate the fuel via thermal conversion of a precursor material thereby also heating a part of the geologic formation;
   a fuel extractor configured for extracting the generated fuel from the target volume;
   a cooler, operably connected to the fuel extractor, the cooler configured for cooling the extracted fuel; wherein the fuel comprises hydrogen gas, and the cooler comprises a cryogenic cooler configured for cooling the hydrogen gas below a temperature of 20 degrees Kelvin to generate liquid hydrogen;
   a cryogenic storage tank for storing the generated liquid hydrogen; and
   a geothermal energy harvesting system configured for recovering heat from the heated geologic formation, and for providing the recovered heat for usage in one or more of: heating the target volume, heating a different target volume, extracting the fuel, recovering the heat from the geologic formation, processing of the extracted fuel, and converting the recovered heat into a storable form of energy.

13. The system of claim 12, wherein the geothermal energy harvesting system is configured for recovering the heat from the geologic formation by extracting one or more of: warm water or steam from the geologic formation.

14. The system of claim 12, wherein the geothermal energy harvesting system comprises a pump for pumping a working fluid through subsurface heat exchange tubing arranged in thermal contact with a part of the geologic formation.

15. The system of claim 12, wherein the geothermal energy harvesting system comprises an electricity generator operably connected to a turbine and configured for generating electricity from the extracted heat.

16. The system of claim 12, wherein the heating system comprises one or more of: an electromagnetic heating system, a thermoelectric heating system, a steam heating system, and a combustion heating system.

17. The system of claim 12, wherein the precursor material comprises one or more of: solid organic material, natural gas, and liquid crude oil.

18. The system of claim 12, wherein the generated fuel comprises one or more of: liquid crude oil, natural gas, and hydrogen gas.

19. The system of claim 12, further comprising a compressor, operably connected to the fuel extractor, the compressor configured for compressing the extracted fuel.

20. The system of claim 12, further comprising a carbon dioxide separator for separating carbon dioxide from the generated fuel.

* * * * *